(12) United States Patent
Wang et al.

(10) Patent No.: US 12,021,593 B2
(45) Date of Patent: Jun. 25, 2024

(54) DELTA CHANNEL STATE INFORMATION REPORTING

(71) Applicant: QUALCOMM Incorporated, San Diego, CA (US)

(72) Inventors: Xiaojie Wang, Hillsborough, NJ (US); Junyi Li, Fairless Hills, PA (US); Piyush Gupta, Bridgewater, NJ (US); Chih-Hao Liu, San Diego, CA (US); Xiaoxia Zhang, San Diego, CA (US); Jing Sun, San Diego, CA (US); Yisheng Xue, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 221 days.

(21) Appl. No.: 17/456,074

(22) Filed: Nov. 22, 2021

(65) Prior Publication Data
US 2023/0163827 A1    May 25, 2023

(51) Int. Cl.
*H04B 7/06*   (2006.01)
*H04L 1/00*   (2006.01)

(52) U.S. Cl.
CPC ......... *H04B 7/0641* (2013.01); *H04B 7/0626* (2013.01); *H04B 7/0632* (2013.01); *H04L 1/0003* (2013.01)

(58) Field of Classification Search
None
See application file for complete search history.

(56) References Cited

U.S. PATENT DOCUMENTS

| 2010/0291935 | A1* | 11/2010 | Rudrapatna | H04B 7/2606 455/450 |
| 2011/0299626 | A1  | 12/2011 | Kim et al. | |
| 2013/0122953 | A1  | 5/2013  | Zhang et al. | |
| 2013/0242902 | A1* | 9/2013  | Liu | H04L 5/0048 370/329 |

OTHER PUBLICATIONS

International Search Report and Written Opinion—PCT/US2022/077261—ISA/EPO—dated Jan. 2, 2023.

* cited by examiner

*Primary Examiner* — Minh Trang T Nguyen
(74) *Attorney, Agent, or Firm* — Harrity & Harrity, LLP

(57) ABSTRACT

Various aspects of the present disclosure generally relate to wireless communication. In some aspects, a first wireless communication device may receive a configuration associated with reporting delta channel state information (CSI). The first wireless communication device may compute the delta CSI based at least in part on the configuration, the delta CSI indicating a difference between first CSI associated with a first connection and second CSI associated with a second connection, the first connection being between the first wireless communication device and a base station and the second connection being between the first wireless communication device and a second wireless communication device. The first wireless communication device may transmit, based at least in part on the configuration, a CSI report including an indication of the delta CSI and at least one of an indication of the first CSI or an indication of the second CSI. Numerous other aspects are described.

30 Claims, 9 Drawing Sheets

DELTA CHANNEL STATE INFORMATION REPORTING

FIELD OF THE DISCLOSURE

Aspects of the present disclosure generally relate to wireless communication and to techniques and apparatuses for delta channel state information (CSI) reporting.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LIE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a first wireless communication device. The method may include receiving a configuration associated with reporting delta channel state information (CSI). The method may include computing the delta CSI based at least in part on the configuration, the delta CSI indicating a difference between first CSI associated with a first connection and second CSI associated with a second connection, the first connection being between the first wireless communication device and a base station and the second connection being between the first wireless communication device and a second wireless communication device. The method may include transmitting a CSI report based at least in part on the configuration, the CSI report including an indication of the delta CSI and at least one of an indication of the first CSI or an indication of the second CSI.

Some aspects described herein relate to a method of wireless communication performed by a base station. The method may include transmitting, to a first wireless communication device, a configuration associated with reporting delta CSI. The method may include receiving a CSI report from the first wireless communication device, the CSI report including an indication of a delta CSI and at least one of an indication of a first CSI associated with a first connection and second CSI associated with a second connection, the delta CSI indicating a difference between the first CSI and the second CSI, and the first connection being between the first wireless communication device and the base station and the second connection being between the first wireless communication device and a second wireless communication device.

Some aspects described herein relate to an apparatus for wireless communication at a first wireless communication. The apparatus may include a memory and one or more processors coupled to the memory. The one or more processors may be configured to receive a configuration associated with reporting delta CSI. The one or more processors may be configured to compute the delta CSI based at least in part on the configuration, the delta CSI indicating a difference between first CSI associated with a first connection and second CSI associated with a second connection, the first connection being between the first wireless communication device and a base station and the second connection being between the first wireless communication device and a second wireless communication device. The one or more processors may be configured to transmit a CSI report based at least in part on the configuration, the CSI report including an indication of the delta CSI and at least one of an indication of the first CSI or an indication of the second CSI.

Some aspects described herein relate to an apparatus for wireless communication at a base station. The apparatus may include a memory and one or more processors coupled to the memory. The one or more processors may be configured to transmit, to a first wireless communication device, a configuration associated with reporting delta CSI. The one or more processors may be configured to receive a CSI report from the first wireless communication device, the CSI report including an indication of a delta CSI and at least one of an indication of a first CSI associated with a first connection and second CSI associated with a second connection, the delta CSI indicating a difference between the first CSI and the second CSI, and the first connection being between the first wireless communication device and the base station and the second connection being between the first wireless communication device and a second wireless communication device.

Some aspects described herein relate to a non-transitory computer-readable medium that stores a set of instructions for wireless communication by a first wireless communication device. The set of instructions, when executed by one or more processors of the first wireless communication device, may cause the first wireless communication device to receive a configuration associated with reporting delta CSI.

The set of instructions, when executed by one or more processors of the first wireless communication device, may cause the first wireless communication device to compute the delta CSI based at least in part on the configuration, the delta CSI indicating a difference between first CSI associated with a first connection and second CSI associated with a second connection, the first connection being between the first wireless communication device and a base station and the second connection being between the first wireless communication device and a second wireless communication device. The set of instructions, when executed by one or more processors of the first wireless communication device, may cause the first wireless communication device to transmit a CSI report based at least in part on the configuration, the CSI report including an indication of the delta CSI and at least one of an indication of the first CSI or an indication of the second CSI.

Some aspects described herein relate to a non-transitory computer-readable medium that stores a set of instructions for wireless communication by a base station. The set of instructions, when executed by one or more processors of the base station, may cause the base station to transmit, to a first wireless communication device, a configuration associated with reporting delta CSI. The set of instructions, when executed by one or more processors of the base station, may cause the base station to receive a CSI report from the first wireless communication device, the CSI report including an indication of a delta CSI and at least one of an indication of a first CSI associated with a first connection and second CSI associated with a second connection, the delta CSI indicating a difference between the first CSI and the second CSI, and the first connection being between the first wireless communication device and the base station and the second connection being between the first wireless communication device and a second wireless communication device.

Some aspects described herein relate to an apparatus for wireless communication. The apparatus may include means for receiving a configuration associated with reporting delta CSI. The apparatus may include means for computing the delta CSI based at least in part on the configuration, the delta CSI indicating a difference between first CSI associated with a first connection and second CSI associated with a second connection, the first connection being between the apparatus and a base station and the second connection being between the apparatus and a wireless communication device. The apparatus may include means for transmitting a CSI report based at least in part on the configuration, the CSI report including an indication of the delta CSI and at least one of an indication of the first CSI or an indication of the second CSI.

Some aspects described herein relate to an apparatus for wireless communication. The apparatus may include means for transmitting, to a first wireless communication device, a configuration associated with reporting delta CSI. The apparatus may include means for receiving a CSI report from the first wireless communication device, the CSI report including an indication of a delta CSI and at least one of an indication of a first CSI associated with a first connection and second CSI associated with a second connection, the delta CSI indicating a difference between the first CSI and the second CSI, and the first connection being between the first wireless communication device and the apparatus and the second connection being between the first wireless communication device and a second wireless communication device.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
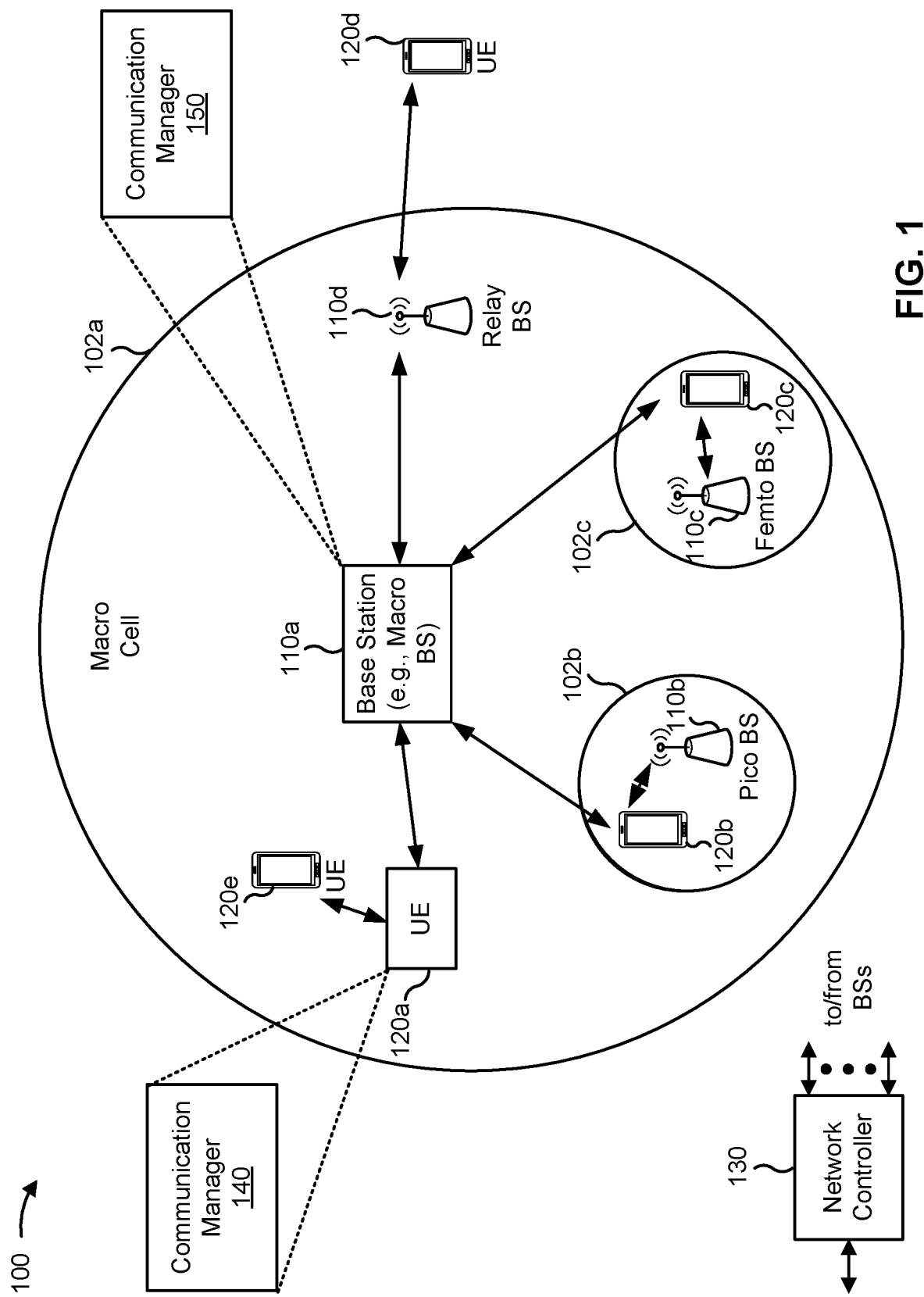
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a first wireless communication device, such as a first UE 120, may include a communication manager 140. As described in more detail elsewhere herein, the communication manager 140 may receive a configuration associated with reporting delta channel state information (CSI); compute the delta CSI based at least in part on the configuration, the delta CSI indicating a difference between first CSI associated with a first connection and second CSI associated with a second connection, the first connection being between the first wireless communication device and a base station (e.g., a base station 110) and the second connection being between the first wireless communication device and a second wireless communication device (e.g., a second UE 120); and transmit a CSI report based at least in part on the configuration, the CSI report including an indication of the delta CSI and at least one of an indication of the first CSI or an indication of the second CSI. Additionally, or alternatively, the communication manager 140 may perform one or more other operations described herein.

In some aspects, the base station 110 may include a communication manager 150. As described in more detail elsewhere herein, the communication manager 150 may transmit, to a first wireless communication device (e.g., a first UE 120), a configuration associated with reporting delta CSI; and receive a CSI report from the first wireless communication device, the CSI report including an indication of a delta CSI and at least one of an indication of a first CSI associated with a first connection and second CSI associated with a second connection, the delta CSI indicating a difference between the first CSI and the second CSI, and the first connection being between the first wireless communication device and the base station and the second connection being between the first wireless communication device and a second wireless communication device (e.g., a second UE 120). Additionally, or alternatively, the communication manager 150 may perform one or more other operations described herein.

As indicated above, FIG. 1 is provided as an example. Other examples may differ from what is described with regard to FIG. 1.

Figure 2:
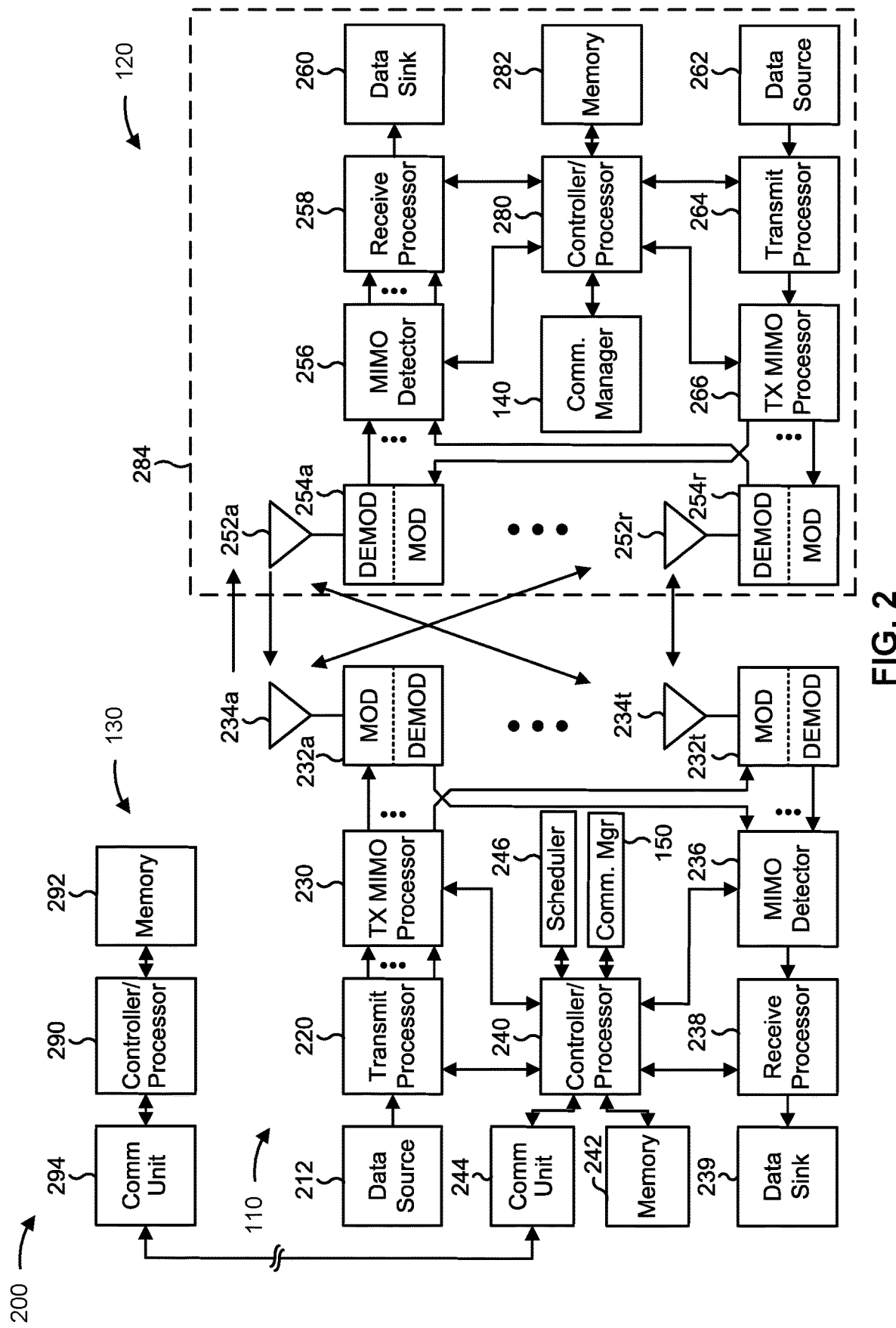
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-9).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-9).

The controller/processor 240 of the base station 110, the controller/processor 280 of the UE 120, and/or any other component(s) of FIG. 2 may perform one or more techniques associated with delta CSI reporting, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, a first wireless communication device, such as a first UE 120, includes means for receiving a configuration associated with reporting delta CSI; means for computing the delta CSI based at least in part on the configuration, the delta CSI indicating a difference between first CSI associated with a first connection and second CSI associated with a second connection, the first connection being between the first wireless communication device and a base station (e.g., a base station 110) and the second connection being between the first wireless communication device and a second wireless communication device (e.g., a second UE 120); and/or means for transmitting a CSI report based at least in part on the configuration, the CSI report including an indication of the delta CSI and at least one of an indication of the first CSI or an indication of the second CSI. In some aspects, the means for the first wireless communication device to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a base station (e.g., a base station 110) includes means for transmitting, to a first wireless communication device (e.g., a first UE 120), a configuration associated with reporting delta CSI; and/or means for receiving a CSI report from the first wireless communication device, the CSI report including an indication of a delta CSI and at least one of an indication of a first CSI associated with a first connection and second CSI associated with a second connection, the delta CSI indicating a difference between the first CSI and the second CSI, and the first connection being between the first wireless communication device and the base station and the second connection being between the first wireless communication device and a second wireless communication device (e.g., a second UE 120). The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
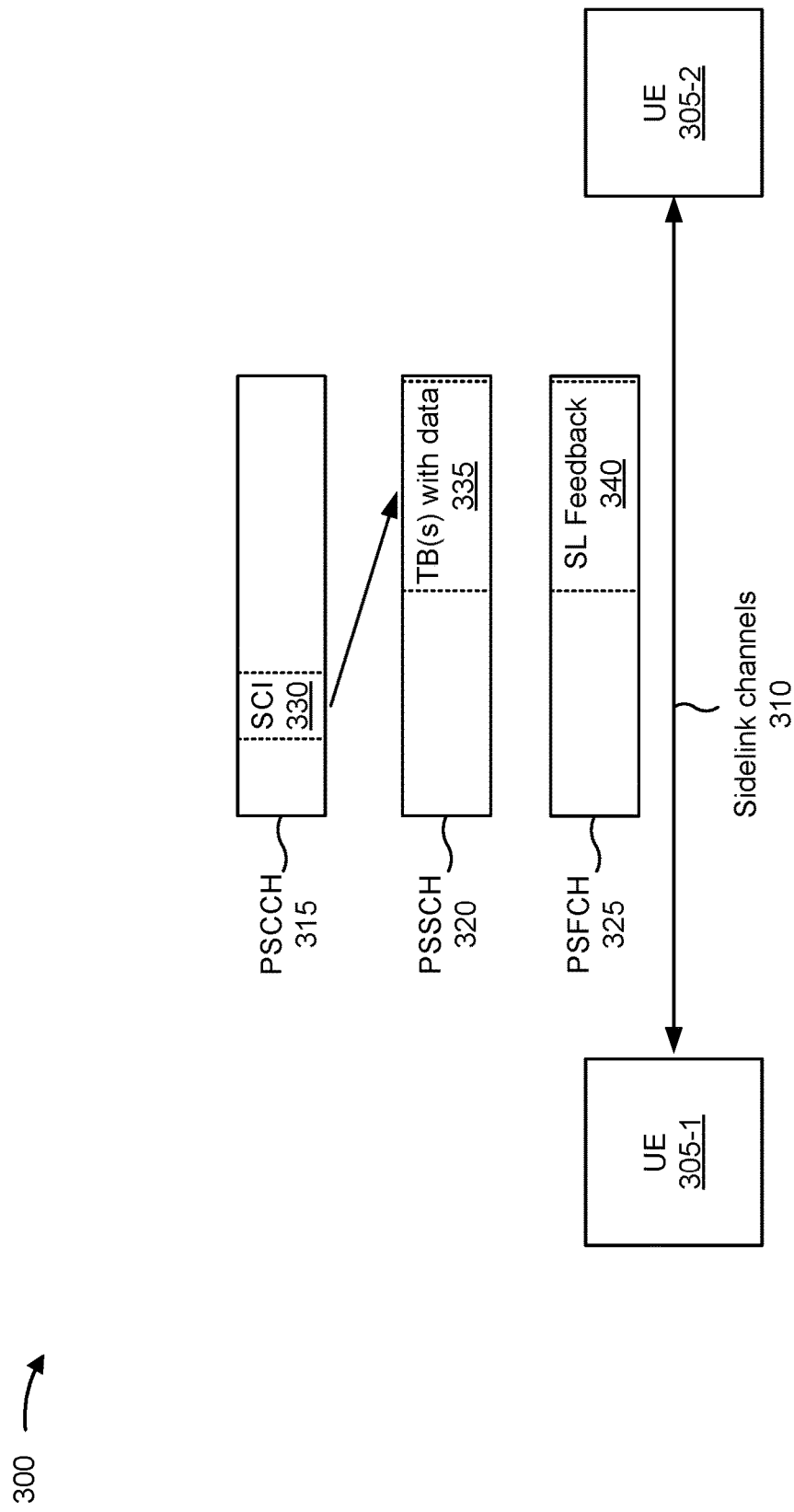
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some aspects, the UEs 305 (e.g., UE 305-1 and/or UE 305-2) may correspond to one or more other wireless communication devices described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), and/or a scheduling request (SR).

Although shown on the PSCCH 315, in some aspects, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QoS) priority value, a resource reservation period, a PSSCH demodulation reference signal (DMRS) pattern, an SCI format for the SCI-2, a beta offset for the SCI-2, a quantity of PSSCH DMRS ports, and/or a modulation and coding scheme (MCS). The SCI-2 may include information associated with data transmissions on the PSSCH 320, such as a hybrid automatic repeat request (HARQ) process ID, a new data indicator (NDI), a source identifier, a destination identifier, and/or a channel state information (CSI) report trigger.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a sidelink transmission mode (e.g., Mode 1) where resource selection and/or scheduling is performed by a base station 110. For example, the UE 305 may receive a grant (e.g., in downlink control information (DCI) or in a radio resource control (RRC) message, such as for configured grants) from the base station 110 for sidelink channel access and/or scheduling. In some aspects, a UE 305 may operate using a transmission mode (e.g., Mode 2) where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, and/or may measure a reference signal received quality (RSRQ) parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or a modulation and coding scheme (MCS) to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

In some aspects, the techniques and apparatuses for delta CSI reporting described herein may be applied in conjunction with a sidelink communication scheme such as that described in association with example 300.

As indicated above, FIG. 3 is provided as an example. Other examples may differ from what is described with respect to FIG. 3.

Figure 4:
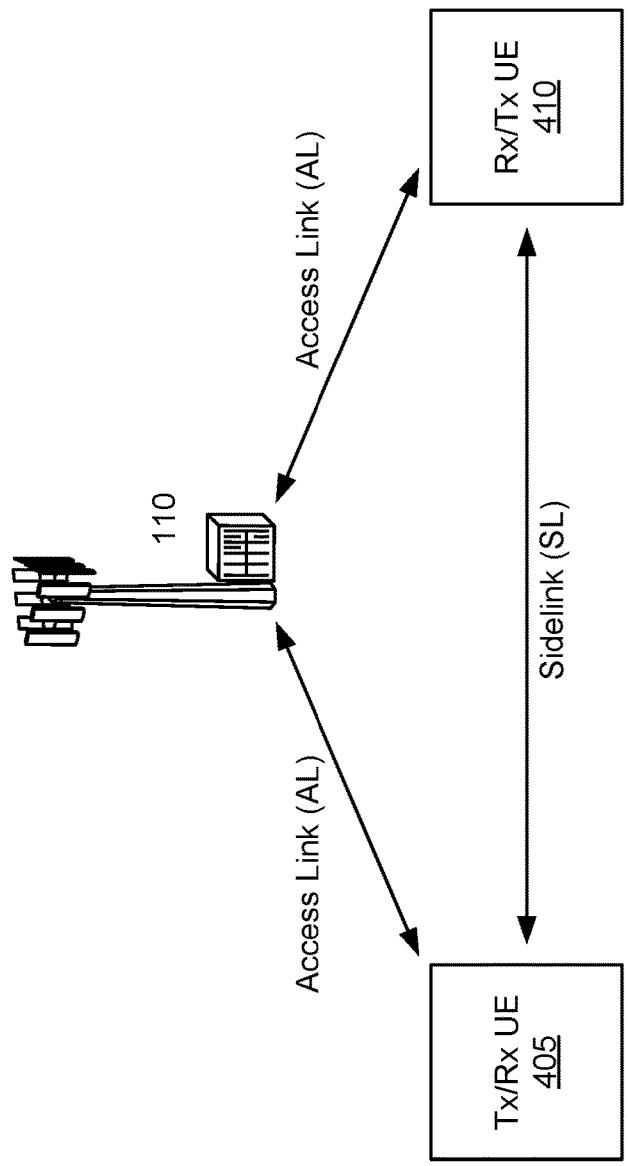
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link (e.g., a first Uu link). Additionally, or alternatively, in some sidelink modes, the base station 110 may communicate with the Rx/Tx UE 410 via a second access link (e.g., a second Uu link). The Tx/Rx UE 405 and/or the Rx/Tx UE 410 may correspond to one or more wireless communication devices described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

In some aspects, the techniques and apparatuses for delta CSI reporting described herein may be applied in conjunction with a sidelink and access link communication scheme such as that described in association with example 400.

As indicated above, FIG. 4 is provided as an example. Other examples may differ from what is described with respect to FIG. 4.

In a wireless communication system configured to support sidelink communications, CSI associated with a sidelink between a first wireless communication device (e.g., a first UE 120 120) and a second wireless communication device (e.g., a second UE 120) is not reported to a base station 110. Rather, the CSI associated with the sidelink may be available only to a wireless communication device that is to transmit a sidelink communication on the sidelink. Notably, when the transmitting wireless communication device is operating in the sidelink transmission mode where resource selection and/or scheduling is performed by the base station 110 (e.g., Mode 1), the sidelink CSI is not available to the base station 110 and, therefore, resource selection and/or scheduling may result in some inefficiency (e.g., since the base station 110 is not aware of channel conditions on the sidelink). Notably, when the transmitter wireless communication device is operating in the sidelink transmission mode where resource selection and/or scheduling is performed by the base station 110, the transmitter wireless communication device can select an MCS based on the sidelink CSI and within an MCS range specified by the UE 120.

In some applications, multi-path diversity may be utilized to improve reliability and latency of communications among a group of wireless communication devices that utilize sidelink communications. For example, in an industrial Internet-of-things (IIoT) scenario, a first wireless communication device (e.g., a UE 120 in the form of a programmable logic controller (PLC)) may be configured for communication with a base station 110 over an access link (e.g., a Uu link). Further, a second wireless communication device (e.g., a second UE 120 in the form of a sensor/actuator (S/A)) may be configured for communication with the base station 110 over a second access link, and a third wireless communication device (e.g., a third UE 120 in the form of an S/A) may be configured for communication with the base station 110 over a third access link. Further, the first wireless communication device may be configured for communication with the second wireless communication device over a first sidelink, and may be configured for communication with the third wireless communication device over a second sidelink. In this scenario, if the first sidelink (e.g., between the first wireless communication device and the second wireless communication device) is blocked or is otherwise unreliable, then two-hop communication over the access links with the base station 110 may be utilized to ensure reliability (at a cost of increased latency). Here, providing seamless path switching between the sidelink and the access link(s) is a significant factor to ensuring reliability and reducing latency.

In order to provide seamless path switching, the base station 110 needs CSI associated with the sidelink. In some cases, a dedicated or separate CSI report could be used to report sidelink CSI. However, the dedicated or separate CSI report increases an amount of overhead and resource usage and, therefore, may be undesirable.

Some aspects described herein provide techniques and apparatuses for delta CSI reporting. In some aspects, a base station may transmit, and a first wireless communication device may receive, a configuration associated with reporting delta CSI. As described in further detail below, delta CSI is CSI that indicates a difference between first CSI associated with a first connection (e.g., a channel quality indicator (CQI) associated with a connection over a Uu link) and second CSI associated with a second connection (e.g., a CQI associated with a connection over a sidelink). The first wireless communication device may compute the delta CSI based at least in part on the configuration, and may transmit, to the base station, a CSI report including an indication of the delta CSI. Additional details are provided below.

In some aspects, the techniques and apparatuses for delta CSI reporting described herein enable the base station to provide seamless path switching between a sidelink and one or more access links, thereby improving reliability and reducing latency in a wireless communication system. Notably, the indication of the delta CSI may be carried in as few as one bit and, therefore, does not significantly increase overhead, while still facilitating path selection by the base station 110.

Figure 5:
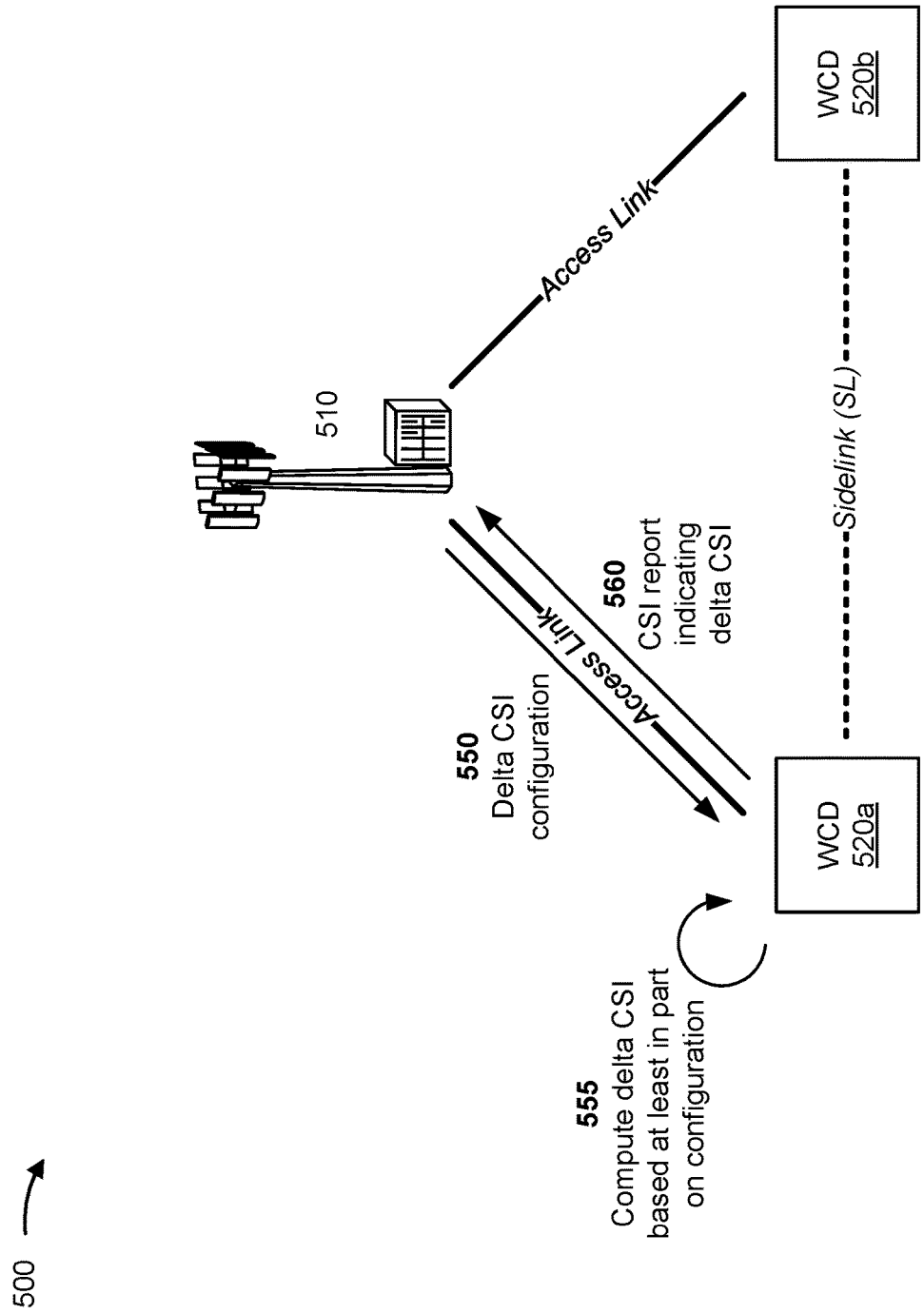
FIG. 5 is a diagram illustrating an example associated with delta channel state information (CSI) reporting, in accordance with the present disclosure.

FIG. 5 is a diagram illustrating an example 500 associated with delta CSI reporting, in accordance with the present disclosure. As shown in FIG. 5, example 500 includes a base station 510, a wireless communication device 520a, and a wireless communication device 520b. In some aspects, the base station 510 may correspond to a base station 110 or another wireless communication device described herein. In some aspects, a wireless communication device 520 (e.g., the wireless communication device 520a, the wireless communication device 520b) may correspond to a UE 120 or another wireless communication device described herein. In some aspects, the base station 510 the wireless communication devices 520 may be included in a wireless network, such as wireless network 100. As indicated in FIG. 5, the base station 510 and the wireless communication device 520a may be configured for communication over a first access link (e.g., a first Uu link), the base station 510 and the wireless communication device 520b may be configured for communication over a second access link (e.g., a second Uu link), and the wireless communication device 520a and the wireless communication device 520b may be configured for communication over a sidelink.

In example 500, as shown by reference 550, the base station 510 may transmit, and the wireless communication device 520a may receive, a configuration associated with reporting delta CSI. In some aspects, delta CSI includes information that indicates a difference between first CSI associated with a first connection and second CSI associated with a second connection, where the first connection is between a first wireless communication device and a base station and the second connection is between the first wireless communication device and a second wireless communication device. For example, in the context of example 500, delta CSI may include information that indicates a difference between CSI associated with the connection between the base station 510 and the wireless communication device 520a over the Uu link and CSI associated with the connection between the wireless communication device 520a and the wireless communication device 520b over the sidelink.

In some aspects, the configuration configures a CSI report to be used for reporting the delta CSI. For example, the configuration may indicate an MCS table for the first CSI, an MCS table for the second CSI, a quantity of bits to be used for an indication of the delta CSI (e.g., a single bit or a plurality of bits), or one or more other parameters associated with CSI reporting.

In some aspects, the configuration indicates that the CSI report to be used for reporting the delta CSI is to include an indication of the first CSI (e.g., the CSI associated with the access link). In such a case, the delta CSI provides information associated with the second CSI. Alternatively, in some aspects, the configuration indicates that the CSI report to be used for reporting the delta CSI is to include an indication of the second CSI (e.g., the CSI associated with the sidelink). In such a case, the delta CSI provides information associated with the first CSI.

As shown by reference 555, the wireless communication device 520a may compute the delta CSI based at least in part on the configuration. For example, the wireless communication device 520a may determine the first CSI based at least in part on the configuration associated with reporting the delta CSI. In some aspects, the wireless communication device 520a may determine the first CSI based at least in part on a measurement of a reference signal transmitted by the base station 510. Further, the wireless communication device 520a may determine the second CSI based at least in part on the configuration associated with reporting the delta CSI. In some aspects, the wireless communication device 520a may determine the second CSI based at least in part on a CSI report received from the wireless communication device 520b (e.g., when the wireless communication device 520b provides a CSI report including sidelink CSI to the wireless communication device 520a) or a measurement of a reference signal transmitted by the wireless communication device 520b. Next, the wireless communication device 520a may determine the delta CSI by, for example, determining a difference between the first CSI and the second CSI.

In some aspects, the first CSI may be a first CQI value associated with the connection over the access link, the second CSI may be a second CQI value associated with the connection over the sidelink, and the delta CSI may be a difference between the first CQI value and the second CQI value.

In some aspects, an MCS table associated with the first connection is the same as an MCS table associated with the second connection. In one such aspect, the indication of the delta CSI may be carried in a single bit. Here, a value carried in the single bit may indicate, for example, whether the first CSI is greater than the second CSI. In another such aspect, the indication of the delta CSI may be carried in a plurality of bits. Here, values carried in the plurality of bits may identify the difference between the first CSI and the second CSI. In some aspects, the values carried in the plurality of bits may be determined based at least in part on a table configured on the wireless communication device 520 (e.g., via radio resource control (RRC) signaling).

In some aspects, when the MCS table associated with the first connection is the same as the MCS table associated with the second connection, the wireless communication device 520a may be configured to compute the delta CSI based at least in part on a rank associated with the first connection and a rank associated with the second connection. For example, the wireless communication device 520a may be configured to determine the first CSI by modifying a first CQI value associated with the first connection based on a rank associated with the first CQI value (e.g., by adding or multiplying the first CQI value and a first rank indicator (RI) associated with the first CQI value). Similarly, the wireless communication device 520a may be configured to determine the second CSI by modifying a second CQI value associated with the second connection based on a second rank associated with the second CQI value (e.g., by adding or multiplying the second CQI value and a second RI associated with the second CQI value). As another example, the wireless communication device 520a may be configured to determine the first CSI by modifying the first CQI value by multiplying the first CQI value by one or more spectral efficiency characteristics associated with the first CQI value, such as an RI value associated with the first CQI, a modulation order associated with the first CQI, a code rate associated with the first CQI, or the like. Similarly, the wireless communication device 520a may be configured to determine the second CSI by modifying the second CQI value by multiplying the second CQI value by one or more spectral efficiency characteristics associated with the second CQI value, such as an RI value associated with the second CQI, a modulation order associated with the second CQI, a code rate associated with the second CQI, or the like.

In some aspects, an MCS table associated with the first connection is different from an MCS table associated with the second connection. In such a case, CQI values are not directly comparable. Therefore, in some aspects, the first CSI may be a first spectral efficiency metric computed based at least in part on a CQI value associated with the first connection and the second CSI may be a second spectral efficiency metric computed based at least in part on a CQI value associated with the second connection. For example, the first CSI may be a first spectral efficiency metric computed based at least in part on multiplying a first CQI associated with the first connection, a modulation order associated with the first CQI, and a code rate associated with the first CQI value. Similarly, the second CSI may be a second spectral efficiency metric computed based at least in part on multiplying a second CQI associated with the second connection, a modulation order associated with the second CQI, and a code rate associated with the second CQI value. Here, the wireless communication device 520a may compute the delta CSI as a difference between the first and second spectral efficiency metrics.

In some aspects, when the MCS table associated with the first connection is the same as the MCS table associated with the second connection, the first CSI may be a first signal-to-interference-plus-noise ratio (SINR) associated with the first connection and the second CSI may be a second SINR associated with the second connection. Here, the wireless communication device 520a may compute the delta CSI based at least in part on a difference between the first SINR and the second SINR.

As shown by reference 560, the wireless communication device 520a may transmit, and the base station 510 may receive, a CSI report based at least in part on the configuration, where the CSI report includes an indication of the delta CSI. In some aspects, the CSI report further includes an indication of the first CSI or an indication of the second CSI.

In some aspects, the wireless communication device 520a may transmit, and the base station 510 may receive, the CSI report in a PUCCH communication. In some aspects, the wireless communication device 520a may transmit, and the base station 510 may receive, the CSI report in a medium access control (MAC) control element.

In some aspects, the indication of the delta CSI may carry a value indicating that either the first CSI or the second CSI is unknown or outdated. For example, in some scenarios, the wireless communication device 520a may be unable to determine at least one of the first CSI or the second CSI (e.g., when the wireless communication device 520a does not receive a reference signal that is to be transmitted by the base station 510, when the wireless communication device 520a does not receive a reference signal that is to be transmitted by the wireless communication device 520b, when the wireless communication device 520a does not receive a CSI report that is to be transmitted by the wireless communication device 520b, or the like). In such a case, the wireless communication device 520a may be configured to utilize an outdated CSI (e.g., a CSI previously determined by the wireless communication device 520a), and may indicate (e.g., using a reserved value in the CSI report) use of the outdated CSI in the CSI report including the delta CSI. Alternatively, the wireless communication device 520a may be configured to indicate (e.g., using a reserved value in the CSI report) that the first or second CSI is unknown, in which case the wireless communication device 520a may not compute or report delta CSI.

In some aspects, the base station 510 may receive the CSI report including the indication of the delta CSI, and may schedule a communication on at least one of the first connection or the second connection based at least in part on the delta CSI. In this way, the base station 510 may perform path selection based at least in part on the delta CSI, thereby improving reliability and reducing latency.

In some aspects, the delta CSI is first delta CSI, and the wireless communication device 520a may be configured to compute second delta CSI based at least in part on the configuration. Here, the second delta CSI may indicate a difference between the first CSI and third CSI associated with a third connection. The third connection may be, for example, a sidelink connection between the wireless communication device 520a and a wireless communication device 520c (not shown). In this example, the CSI report may further include an indication of the second delta CSI. That is, in some aspects, the CSI report may include a plurality of delta CSIs, each associated with a different connection. In some aspects, the CSI report includes information associating the first delta CSI and the wireless communication device 520b (e.g., an identifier associated with the wireless communication device 520b) and information associating the second delta CSI and the wireless communication device 520c (e.g., an identifier associated with the wireless communication device 520c). In this way, the base station 510 may be enabled to identify to which connection each delta CSI applies. In some aspects, a CSI report including a plurality of delta CSIs (and associated wireless communication device 520 identifiers) may be communicated in a multi-entry MAC control element. In some aspects, the plurality of delta CSIs may be sorted in the multi-entry MAC control element in ascending or descending order or based on the respective receiver identifiers.

Notably, while the techniques and apparatuses described herein are primarily described in the context of CSI reporting based on CQI values, these techniques and apparatuses are applicable to other types of reports, such as a report based at least in part on reference signal received power (RSRP), reference signal strength indicator (RSSI), reference signal received quality (RSRQ), SINR, RI, precoding matric indicator (PMI), or layer indicator (LI), among other examples.

Further, while the techniques and apparatuses described herein are described in the context of generic access link and sidelink communications, the techniques and apparatuses described herein may be utilized in a variety of applications and architectures, such as IIoT, V2X, multi-RAT, or multiple transmission reception point (multi-TRP), among other examples.

As indicated above, FIG. 5 is provided as an example. Other examples may differ from what is described with respect to FIG. 5.

Figure 6:
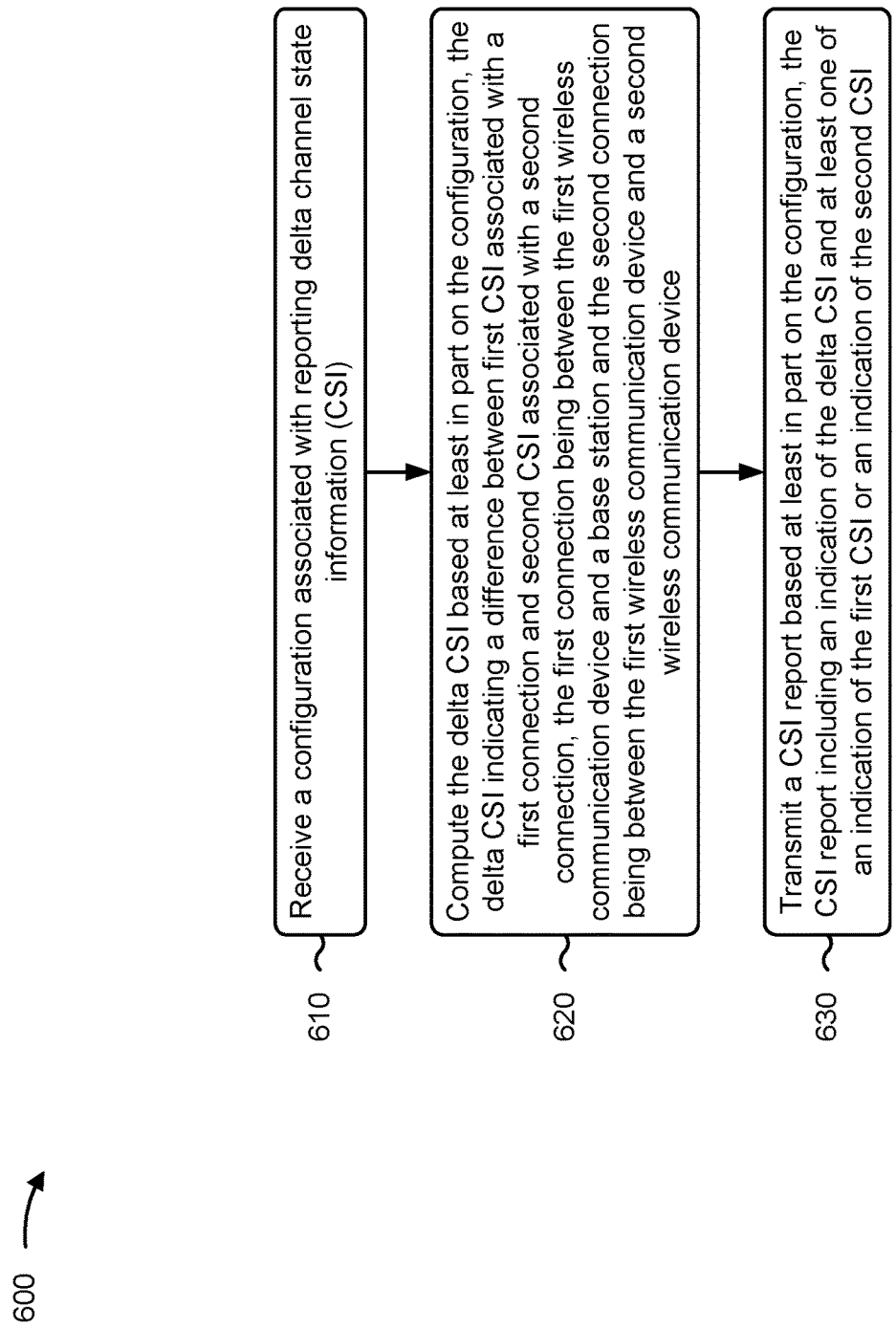
FIGS. 6 and 7 are diagrams illustrating example processes associated with delta CSI reporting, in accordance with the present disclosure.

FIG. 6 is a diagram illustrating an example process 600 performed, for example, by a first wireless communication device, in accordance with the present disclosure. Example process 600 is an example where the first wireless communication device (e.g., a first UE 120) performs operations associated with delta CSI reporting.

As shown in FIG. 6, in some aspects, process 600 may include receiving a configuration associated with reporting delta CSI (block 610). For example, the first wireless communication device (e.g., using communication manager 140 and/or reception component 802, depicted in FIG. 8) may receive a configuration associated with reporting delta CSI, as described above.

As further shown in FIG. 6, in some aspects, process 600 may include computing the delta CSI based at least in part on the configuration, the delta CSI indicating a difference between first CSI associated with a first connection and second CSI associated with a second connection, the first connection being between the first wireless communication device and a base station and the second connection being between the first wireless communication device and a second wireless communication device (block 620). For example, the first wireless communication device (e.g., using communication manager 140 and/or CSI computation component 808, depicted in FIG. 8) may compute the delta CSI based at least in part on the configuration, the delta CSI indicating a difference between first CSI associated with a first connection and second CSI associated with a second connection, the first connection being between the first wireless communication device and a base station and the second connection being between the first wireless communication device and a second wireless communication device, as described above.

As further shown in FIG. 6, in some aspects, process 600 may include transmitting a CSI report based at least in part on the configuration, the CSI report including an indication of the delta CSI and at least one of an indication of the first CSI or an indication of the second CSI (block 630). For example, the first wireless communication device (e.g., using communication manager 140 and/or transmission component 804, depicted in FIG. 8) may transmit a CSI report based at least in part on the configuration, the CSI report including an indication of the delta CSI and at least one of an indication of the first CSI or an indication of the second CSI, as described above.

Process 600 may include additional aspects, such as any single aspect or any combination of aspects described below and/or in connection with one or more other processes described elsewhere herein.

With respect to process 600, in a first aspect, the configuration indicates at least one of an MCS table for the first CSI, an MCS table for the second CSI, or a quantity of bits to be used for the indication of the delta CSI.

With respect to process 600, in a second aspect, alone or in combination with the first aspect, process 600 includes determining the first CSI based at least in part on the configuration associated with reporting the delta CSI or a measurement of a reference signal transmitted by the base station.

With respect to process 600, in a third aspect, alone or in combination with one or more of the first and second aspects, process 600 includes determining the second CSI based at least in part on at least one of the configuration associated with reporting the delta CSI, a CSI report received from the second wireless communication device, or a measurement of a reference signal transmitted by the second wireless communication device.

With respect to process 600, in a fourth aspect, alone or in combination with one or more of the first through third aspects, the configuration indicates that the CSI report is to include the indication of the first CSI and the CSI report includes the indication of the first CSI.

With respect to process 600, in a fifth aspect, alone or in combination with one or more of the first through fourth aspects, the configuration indicates that the CSI report is to include the indication of the second CSI and the CSI report includes the indication of the second CSI.

With respect to process 600, in a sixth aspect, alone or in combination with one or more of the first through fifth aspects, the first connection is a connection over a Uu link and the second connection is a connection over a sidelink.

With respect to process 600, in a seventh aspect, alone or in combination with one or more of the first through sixth aspects, the first CSI is a first CQI value and the second CSI is a second CQI value.

With respect to process 600, in an eighth aspect, alone or in combination with one or more of the first through seventh aspects, an MCS table associated with the first connection is the same as an MCS table associated with the second connection.

With respect to process 600, in a ninth aspect, alone or in combination with one or more of the first through eighth aspects, the indication of the delta CSI is carried in a single bit, wherein a value carried in the single bit indicates whether the first CSI is greater than the second CSI.

With respect to process 600, in a tenth aspect, alone or in combination with one or more of the first through ninth aspects, the indication of the delta CSI is carried in a plurality of bits, wherein values carried in the plurality of bits identify the difference between the first CSI and the second CSI, the values being determined based at least in part on a table configured via RRC signaling.

With respect to process 600, in an eleventh aspect, alone or in combination with one or more of the first through tenth aspects, the delta CSI is computed based at least in part on a rank associated with the first connection and a rank associated with the second connection.

With respect to process 600, in a twelfth aspect, alone or in combination with one or more of the first through eleventh aspects, an MCS table associated with the first connection is different from an MCS table associated with the second connection.

With respect to process 600, in a thirteenth aspect, alone or in combination with one or more of the first through twelfth aspects, the first CSI is a first spectral efficiency metric computed based at least in part on a CQI value associated with the first connection and the second CSI is a second spectral efficiency metric computed based at least in part on a CQI value associated with the second connection.

With respect to process 600, in a fourteenth aspect, alone or in combination with one or more of the first through thirteenth aspects, the first CSI is a first SINR associated with the first connection and the second CSI is a second SINR associated with the second connection.

With respect to process 600, in a fifteenth aspect, alone or in combination with one or more of the first through fourteenth aspects, the indication of the delta CSI carries a value indicating that either the first CSI or the second CSI is unknown or outdated.

With respect to process 600, in a sixteenth aspect, alone or in combination with one or more of the first through fifteenth aspects, the delta CSI is first delta CSI, and process 600 includes computing second delta CSI based at least in part on the configuration, wherein the second delta CSI indicates a difference between the first CSI and third CSI associated with a third connection, the third connection being between the first wireless communication device and a third wireless communication device, and wherein the CSI report includes an indication of the second delta CSI.

With respect to process 600, in a seventeenth aspect, alone or in combination with one or more of the first through sixteenth aspects, the CSI report includes information associating the first delta CSI and the second wireless communication device and information associating the second delta CSI and the third wireless communication device.

With respect to process 600, in an eighteenth aspect, alone or in combination with one or more of the first through seventeenth aspects, the CSI report is transmitted in a PUCCH communication or a MAC control element.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
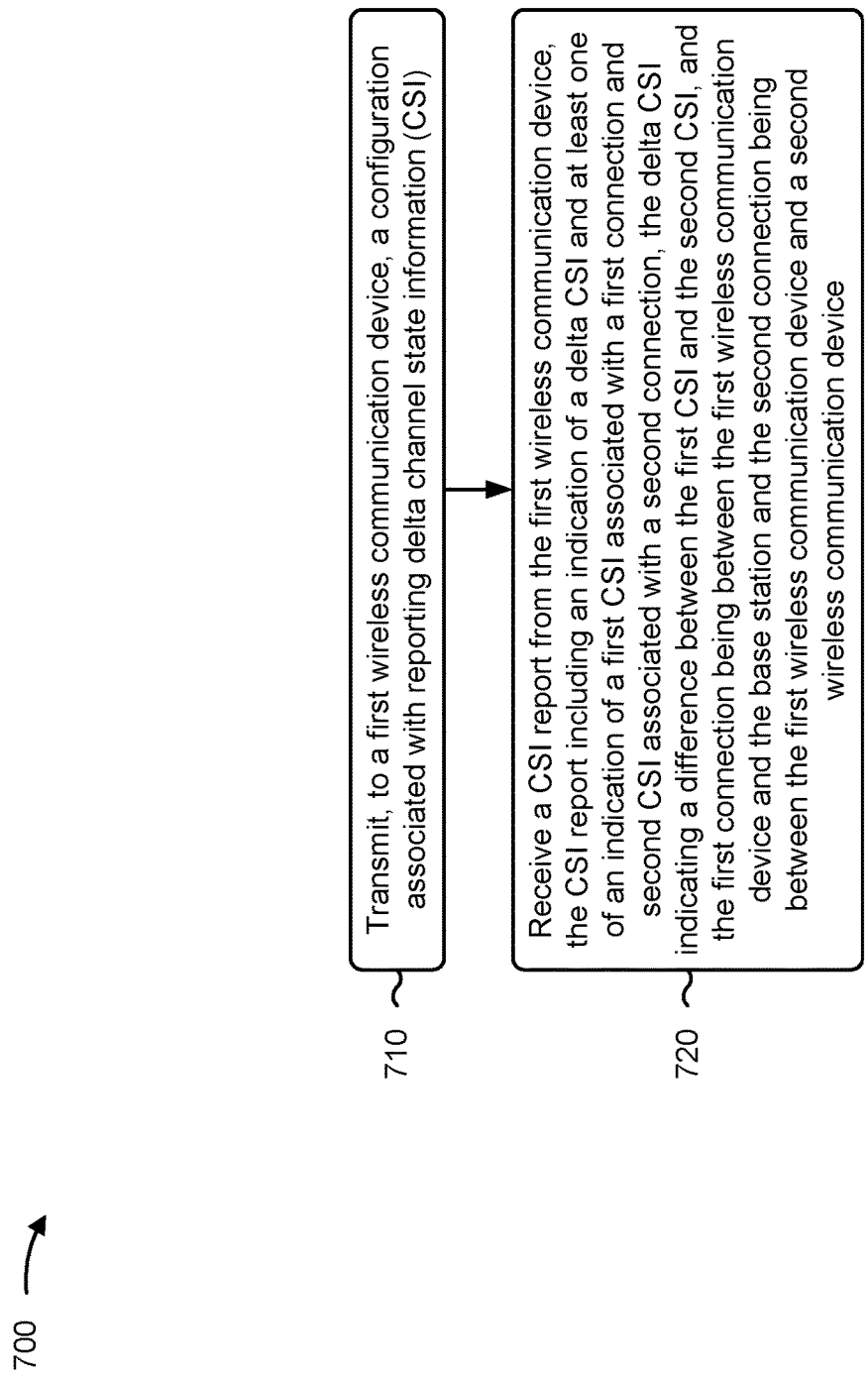

FIG. 7 is a diagram illustrating an example process 700 performed, for example, by a base station, in accordance with the present disclosure. Example process 700 is an example where the base station (e.g., base station 110) performs operations associated with delta CSI reporting.

As shown in FIG. 7, in some aspects, process 700 may include transmitting, to a first wireless communication device, a configuration associated with reporting delta channel state information (CSI) (block 710). For example, the base station (e.g., using communication manager 150, CSI configuration component 908, and/or transmission component 904, depicted in FIG. 9) may transmit, to a first wireless communication device, a configuration associated with reporting delta CSI, as described above.

As further shown in FIG. 7, in some aspects, process 700 may include receiving a CSI report from the first wireless communication device, the CSI report including an indication of a delta CSI and at least one of an indication of a first CSI associated with a first connection and second CSI associated with a second connection, the delta CSI indicating a difference between the first CSI and the second CSI, and the first connection being between the first wireless communication device and the base station and the second connection being between the first wireless communication device and a second wireless communication device (block 720). For example, the base station (e.g., using communication manager 150 and/or reception component 902, depicted in FIG. 9) may receive a CSI report from the first wireless communication device, the CSI report including an indication of a delta CSI and at least one of an indication of a first CSI associated with a first connection and second CSI associated with a second connection, the delta CSI indicating a difference between the first CSI and the second CSI, and the first connection being between the first wireless communication device and the base station and the second connection being between the first wireless communication device and a second wireless communication device, as described above.

Process 700 may include additional aspects, such as any single aspect or any combination of aspects described below and/or in connection with one or more other processes described elsewhere herein.

With respect to process 700, in a first aspect, process 700 includes scheduling a communication on at least one of the first connection or the second connection based at least in part on the delta CSI.

With respect to process 700, in a second aspect, alone or in combination with the first aspect, the configuration indicates at least one of an MCS table for the first CSI, an MCS table for the second CSI, or a quantity of bits to be used for the indication of the delta CSI.

With respect to process 700, in a third aspect, alone or in combination with one or more of the first and second aspects, the configuration indicates that the CSI report is to include the indication of the first CSI and the CSI report includes the indication of the first CSI.

With respect to process 700, in a fourth aspect, alone or in combination with one or more of the first through third aspects, the configuration indicates that the CSI report is to include the indication of the second CSI and the CSI report includes the indication of the second CSI.

With respect to process 700, in a fifth aspect, alone or in combination with one or more of the first through fourth aspects, the first connection is a connection over a Uu link and the second connection is a connection over a sidelink.

With respect to process 700, in a sixth aspect, alone or in combination with one or more of the first through fifth aspects, the first CSI is a first CQI value and the second CSI is a second CQI value.

With respect to process 700, in a seventh aspect, alone or in combination with one or more of the first through sixth aspects, an MCS table associated with the first connection matches an MCS table associated with the second connection.

With respect to process 700, in an eighth aspect, alone or in combination with one or more of the first through seventh aspects, the indication of the delta CSI is carried in a single bit, wherein a value carried in the single bit indicates whether the first CSI is greater than the second CSI.

With respect to process 700, in a ninth aspect, alone or in combination with one or more of the first through eighth aspects, the indication of the delta CSI is carried in a plurality of bits, wherein values carried in the plurality of bits identify the difference between the first CSI and the second CSI.

With respect to process 700, in a tenth aspect, alone or in combination with one or more of the first through ninth aspects, the delta CSI is based at least in part on a rank associated with the first connection and a rank associated with the second connection.

With respect to process 700, in an eleventh aspect, alone or in combination with one or more of the first through tenth aspects, an MCS table associated with the first connection is different from an MCS table associated with the second connection.

With respect to process 700, in a twelfth aspect, alone or in combination with one or more of the first through eleventh aspects, the first CSI is a first spectral efficiency metric that is based at least in part on a CQI value associated with the first connection and the second CSI is a second spectral efficiency metric that is based at least in part on a CQI value associated with the second connection.

With respect to process 700, in a thirteenth aspect, alone or in combination with one or more of the first through twelfth aspects, the first CSI is a first SINR associated with the first connection and the second CSI is a second SINR associated with the second connection.

With respect to process 700, in a fourteenth aspect, alone or in combination with one or more of the first through thirteenth aspects, the indication of the delta CSI carries a value indicating that either the first CSI or the second CSI is unknown or outdated.

With respect to process 700, in a fifteenth aspect, alone or in combination with one or more of the first through fourteenth aspects, the delta CSI is first delta CSI and the CSI report includes an indication of a second delta CSI indicating a difference between the first CSI and third CSI associated with a third connection, the third connection being between the first wireless communication device and a third wireless communication device.

With respect to process 700, in a sixteenth aspect, alone or in combination with one or more of the first through fifteenth aspects, the CSI report includes information associating the first delta CSI and the second wireless communication device and information associating the second delta CSI and the third wireless communication device.

With respect to process 700, in a seventeenth aspect, alone or in combination with one or more of the first through sixteenth aspects, the CSI report is received in a PUCCH communication or a MAC control element.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
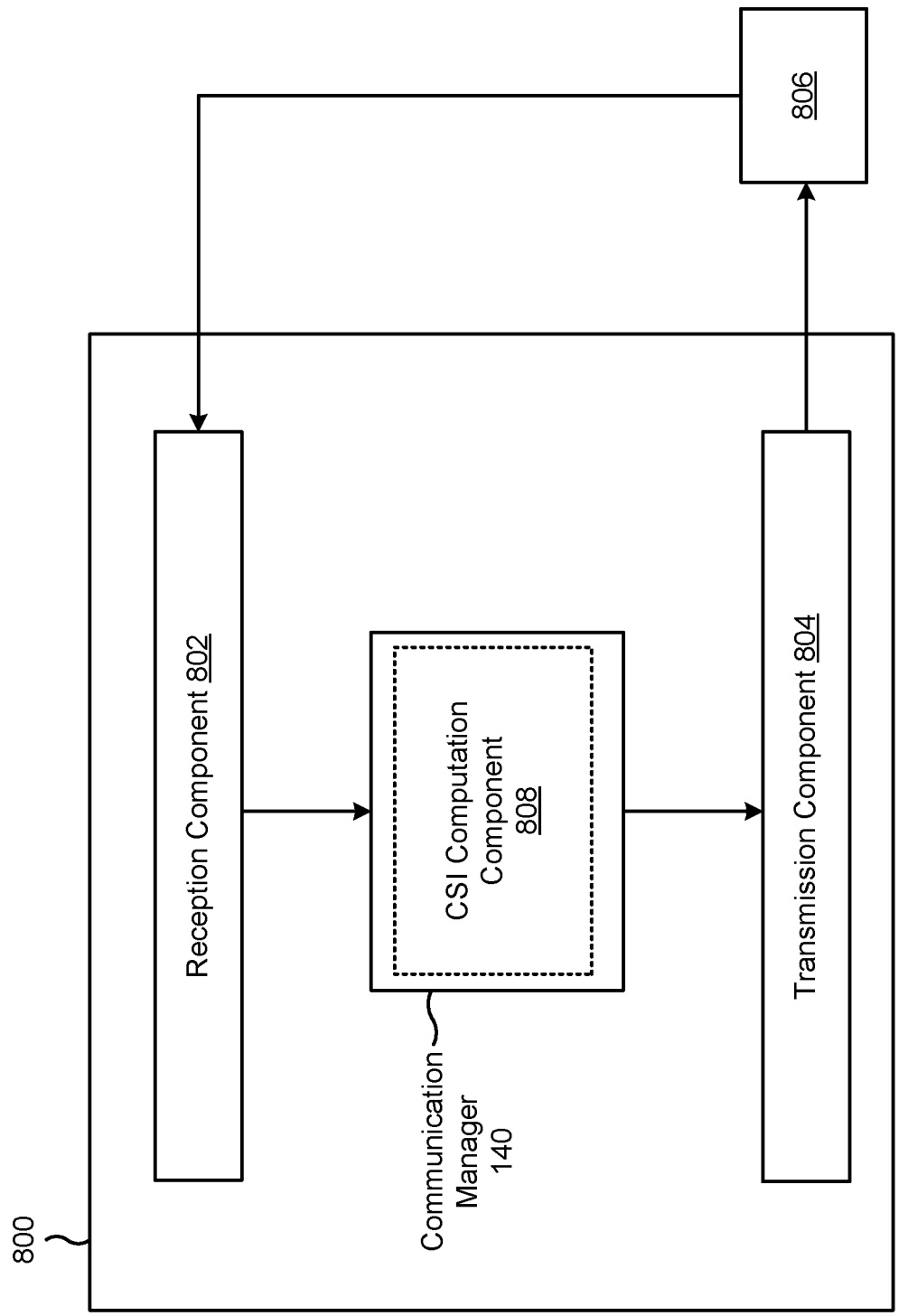
FIGS. 8 and 9 are diagrams of example apparatuses for wireless communication, in accordance with the present disclosure.

FIG. 8 is a diagram of an example apparatus 800 for wireless communication. The apparatus 800 may be a first wireless communication device (e.g., a UE 120), or a first wireless communication device may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 140. The communication manager 140 may include a CSI computation component 808, among other examples.

In some aspects, the apparatus 800 may be configured to perform one or more operations described herein in connection with FIG. 5. Additionally, or alternatively, the apparatus 800 may be configured to perform one or more processes described herein, such as process 600 of FIG. 6. In some aspects, the apparatus 800 and/or one or more components shown in FIG. 8 may include one or more components of the first wireless communication device described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the first wireless communication device described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the first wireless communication device described in connection with FIG. 2. In some aspects, the transmission component 804 may be co-located with the reception component 802 in a transceiver.

The reception component 802 may receive a configuration associated with reporting delta CSI. The CSI computation component 808 may compute the delta CSI based at least in part on the configuration, the delta CSI indicating a difference between first CSI associated with a first connection and second CSI associated with a second connection, the first connection being between the first wireless communication device and a base station and the second connection being between the first wireless communication device and a second wireless communication device. The transmission component 804 may transmit a CSI report based at least in part on the configuration, the CSI report including an indication of the delta CSI and at least one of an indication of the first CSI or an indication of the second CSI.

The CSI computation component 808 may determine the first CSI based at least in part on the configuration associated with reporting the delta CSI or a measurement of a reference signal transmitted by the base station.

The CSI computation component 808 may determine the second CSI based at least in part on at least one of the configuration associated with reporting the delta CSI, a CSI report received from the second wireless communication device, or a measurement of a reference signal transmitted by the second wireless communication device.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
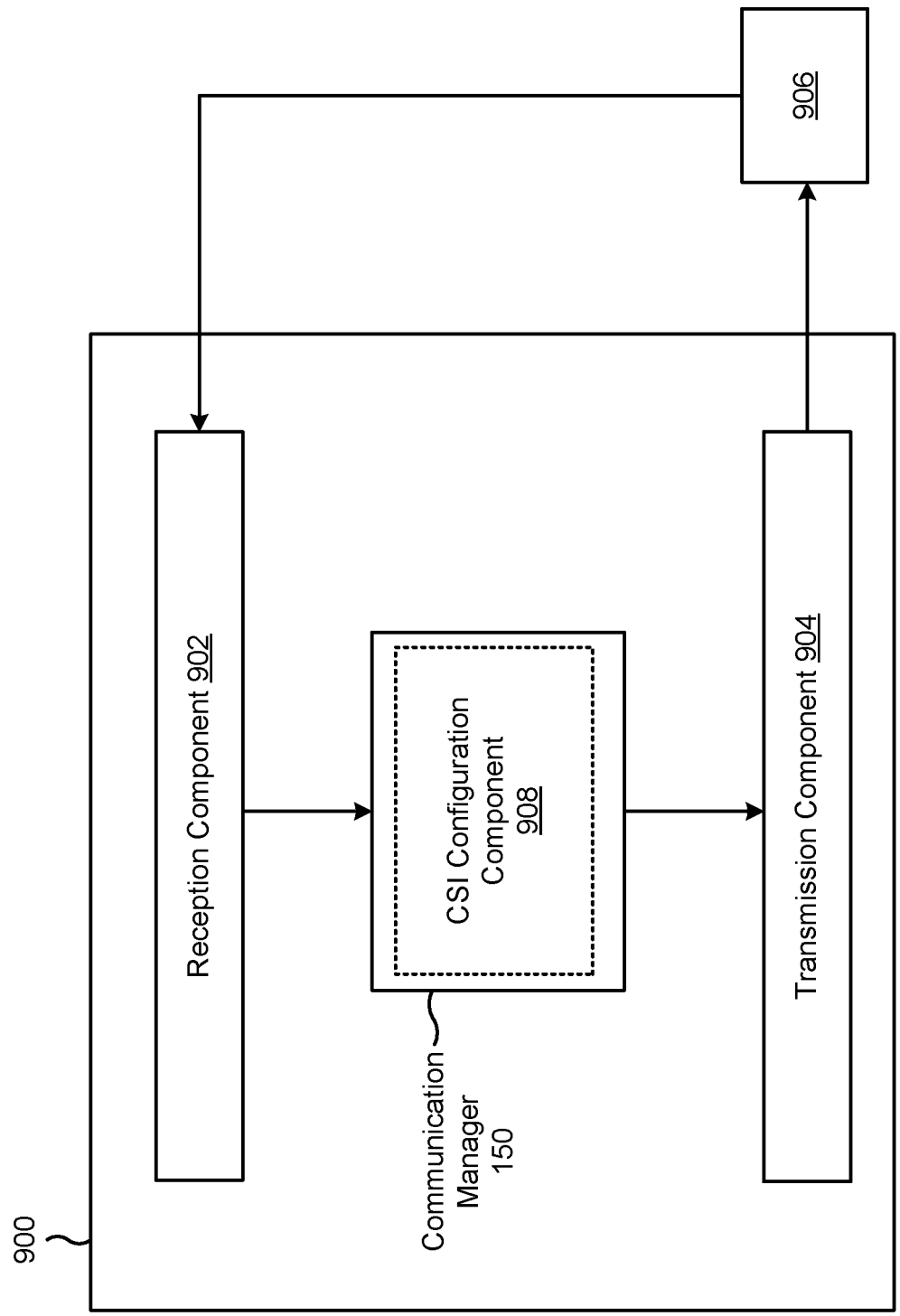

FIG. 9 is a diagram of an example apparatus 900 for wireless communication. The apparatus 900 may be a base station, or a base station may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 150. The communication manager 150 may include a CSI configuration component 908, among other examples.

In some aspects, the apparatus 900 may be configured to perform one or more operations described herein in connection with FIG. 5. Additionally, or alternatively, the apparatus 900 may be configured to perform one or more processes described herein, such as process 700 of FIG. 7. In some aspects, the apparatus 900 and/or one or more components shown in FIG. 9 may include one or more components of the base station described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the base station described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the base station described in connection with FIG. 2. In some aspects, the transmission component 904 may be co-located with the reception component 902 in a transceiver.

The CSI configuration component 908 may transmit, or may cause the transmission component 904 to transmit, to a first wireless communication device, a configuration associated with reporting delta CSI. The reception component 902 may receive a CSI report from the first wireless communication device, the CSI report including an indication of a delta CSI and at least one of an indication of a first CSI associated with a first connection and second CSI associated with a second connection, the delta CSI indicating a difference between the first CSI and the second CSI, and the first connection being between the first wireless communication device and the base station and the second connection being between the first wireless communication device and a second wireless communication device.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a first wireless communication device, comprising: receiving a configuration associated with reporting delta CSI; computing the delta CSI based at least in part on the configuration, the delta CSI indicating a difference between first CSI associated with a first connection and second CSI associated with a second connection, the first connection being between the first wireless communication device and a base station and the second connection being between the first wireless communication device and a second wireless communication device; and transmitting a CSI report based at least in part on the configuration, the CSI report including an indication of the delta CSI and at least one of an indication of the first CSI or an indication of the second CSI.

Aspect 2: The method of Aspect 1, wherein the configuration indicates at least one of an MCS table for the first CSI, an MCS table for the second CSI, or a quantity of bits to be used for the indication of the delta CSI.

Aspect 3: The method of any of Aspects 1-2, further comprising determining the first CSI based at least in part on the configuration associated with reporting the delta CSI or a measurement of a reference signal transmitted by the base station.

Aspect 4: The method of any of Aspects 1-3, further comprising determining the second CSI based at least in part on at least one of the configuration associated with reporting the delta CSI, a CSI report received from the second wireless communication device, or a measurement of a reference signal transmitted by the second wireless communication device.

Aspect 5: The method of any of Aspects 1-4, wherein the configuration indicates that the CSI report is to include the indication of the first CSI and the CSI report includes the indication of the first CSI.

Aspect 6: The method of any of Aspects 1-5, wherein the configuration indicates that the CSI report is to include the indication of the second CSI and the CSI report includes the indication of the second CSI.

Aspect 7: The method of any of Aspects 1-6, wherein the first connection is a connection over a Uu link and the second connection is a connection over a sidelink.

Aspect 8: The method of any of Aspects 1-7, wherein the first CSI is a first CQI value and the second CSI is a second CQI.

Aspect 9: The method of any of Aspects 1-8, wherein an MCS table associated with the first connection is the same as an MCS table associated with the second connection.

Aspect 10: The method of Aspect 9, wherein the indication of the delta CSI is carried in a single bit, wherein a value carried in the single bit indicates whether the first CSI is greater than the second CSI.

Aspect 11: The method of Aspect 9, wherein the indication of the delta CSI is carried in a plurality of bits, wherein values carried in the plurality of bits identify the difference between the first CSI and the second CSI, the values being determined based at least in part on a table configured via RRC signaling.

Aspect 12: The method of any of Aspects 9-11, wherein the delta CSI is computed based at least in part on a rank associated with the first connection and a rank associated with the second connection.

Aspect 13: The method of any of Aspects 1-8, wherein an MCS table associated with the first connection is different from an MCS table associated with the second connection.

Aspect 14: The method of Aspect 13, wherein the first CSI is a first spectral efficiency metric computed based at least in part on a CQI value associated with the first connection and the second CSI is a second spectral efficiency metric computed based at least in part on a CQI value associated with the second connection.

Aspect 15: The method of Aspect 13, wherein the first CSI is a first SINR associated with the first connection and the second CSI is a second SINR associated with the second connection.

Aspect 16: The method of any of Aspects 1-15, wherein the indication of the delta CSI carries a value indicating that either the first CSI or the second CSI is unknown or outdated.

Aspect 17: The method of any of Aspects 1-16, wherein the delta CSI is first delta CSI, and the method further comprises computing second delta CSI based at least in part on the configuration, wherein the second delta CSI indicates a difference between the first CSI and third CSI associated with a third connection, the third connection being between the first wireless communication device and a third wireless communication device, and wherein the CSI report includes an indication of the second delta CSI.

Aspect 18: The method of Aspect 17, wherein the CSI report includes information associating the first delta CSI and the second wireless communication device and information associating the second delta CSI and the third wireless communication device.

Aspect 19: The method of any of Aspects 17-18, wherein the CSI report is transmitted in a PUCCH communication or a MAC control element.

Aspect 20: A method of wireless communication performed by a base station, comprising: transmitting, to a first wireless communication device, a configuration associated with reporting delta CSI; and receiving a CSI report from the first wireless communication device, the CSI report including an indication of a delta CSI and at least one of an indication of a first CSI associated with a first connection and second CSI associated with a second connection, the delta CSI indicating a difference between the first CSI and the second CSI, and the first connection being between the first wireless communication device and the base station and the second connection being between the first wireless communication device and a second wireless communication device.

Aspect 21: The method of Aspect 20, further comprising scheduling a communication on at least one of the first connection or the second connection based at least in part on the delta CSI.

Aspect 22: The method of any of Aspects 20-21, wherein the configuration indicates at least one of an MCS table for the first CSI, an MCS table for the second CSI, or a quantity of bits to be used for the indication of the delta CSI.

Aspect 23: The method of any of Aspects 20-22, wherein the configuration indicates that the CSI report is to include the indication of the first CSI and the CSI report includes the indication of the first CSI.

Aspect 24: The method of any of Aspects 20-23, wherein the configuration indicates that the CSI report is to include the indication of the second CSI and the CSI report includes the indication of the second CSI.

Aspect 25: The method of any of Aspects 20-24, wherein the first connection is a connection over a Uu link and the second connection is a connection over a sidelink.

Aspect 26: The method of any of Aspects 20-25, wherein the first CSI is a first CQI value and the second CSI is a second CQI.

Aspect 27: The method of any of Aspects 20-26, wherein an MCS table associated with the first connection matches an MCS table associated with the second connection.

Aspect 28: The method of Aspect 27, wherein the indication of the delta CSI is carried in a single bit, wherein a value carried in the single bit indicates whether the first CSI is greater than the second CSI.

Aspect 29: The method of Aspect 27, wherein the indication of the delta CSI is carried in a plurality of bits, wherein values carried in the plurality of bits identify the difference between the first CSI and the second CSI.

Aspect 30: The method of any of Aspects 27-29, wherein the delta CSI is based at least in part on a rank associated with the first connection and a rank associated with the second connection.

Aspect 31: The method of any of Aspects 20-26, wherein an MCS table associated with the first connection is different from an MCS table associated with the second connection.

Aspect 32: The method of Aspect 31, wherein the first CSI is a first spectral efficiency metric that is based at least in part on a CQI value associated with the first connection and the second CSI is a second spectral efficiency metric that is based at least in part on a CQI value associated with the second connection.

Aspect 33: The method of Aspect 31, wherein the first CSI is a first SINR associated with the first connection and the second CSI is a second SINR associated with the second connection.

Aspect 34: The method of any of Aspects 20-33, wherein the indication of the delta CSI carries a value indicating that either the first CSI or the second CSI is unknown or outdated.

Aspect 35: The method of any of Aspects 20-34, wherein the delta CSI is first delta CSI and the CSI report includes an indication of a second delta CSI indicating a difference between the first CSI and third CSI associated with a third connection, the third connection being between the first wireless communication device and a third wireless communication device.

Aspect 36: The method of Aspect 35, wherein the CSI report includes information associating the first delta CSI and the second wireless communication device and information associating the second delta CSI and the third wireless communication device.

Aspect 37: The method of any of Aspects 35-36, wherein the CSI report is received in a PUCCH communication or a MAC control element.

Aspect 38: An apparatus for wireless communication at a device, comprising a processor; memory coupled with the processor; and instructions stored in the memory and executable by the processor to cause the apparatus to perform the method of one or more of Aspects 1-19.

Aspect 39: A device for wireless communication, comprising a memory and one or more processors coupled to the memory, the one or more processors configured to perform the method of one or more of Aspects 1-19.

Aspect 40: An apparatus for wireless communication, comprising at least one means for performing the method of one or more of Aspects 1-19.

Aspect 41: A non-transitory computer-readable medium storing code for wireless communication, the code comprising instructions executable by a processor to perform the method of one or more of Aspects 1-19.

Aspect 42: A non-transitory computer-readable medium storing a set of instructions for wireless communication, the set of instructions comprising one or more instructions that, when executed by one or more processors of a device, cause the device to perform the method of one or more of Aspects 1-19.

Aspect 43: An apparatus for wireless communication at a device, comprising a processor; memory coupled with the processor; and instructions stored in the memory and executable by the processor to cause the apparatus to perform the method of one or more of Aspects 20-37.

Aspect 44: A device for wireless communication, comprising a memory and one or more processors coupled to the memory, the one or more processors configured to perform the method of one or more of Aspects 20-37.

Aspect 45: An apparatus for wireless communication, comprising at least one means for performing the method of one or more of Aspects 20-37.

Aspect 46: A non-transitory computer-readable medium storing code for wireless communication, the code comprising instructions executable by a processor to perform the method of one or more of Aspects 20-37.

Aspect 47: A non-transitory computer-readable medium storing a set of instructions for wireless communication, the set of instructions comprising one or more instructions that, when executed by one or more processors of a device, cause the device to perform the method of one or more of Aspects 20-37.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a first wireless communication device, comprising:
    memory; and
    one or more processors, coupled to the memory, configured to:
        receive a configuration associated with reporting delta channel state information (CSI) for sidelink;
        compute, using the configuration, the delta CSI in association with a sidelink connection between the first wireless communication device and a second wireless communication device,
            wherein the delta CSI indicates a difference between first CSI, associated with a first connection between the first wireless communication device and a base station, and second CSI associated with the sidelink connection; and
        transmit a CSI report using the configuration, the CSI report including an indication of the delta CSI and at least one of:
            an indication of the first CSI, wherein the delta CSI provides information associated with the second CSI associated with the sidelink connection, or
            an indication of the second CSI associated with the sidelink connection,
        wherein the delta CSI provides information associated with the first CSI.

2. The apparatus of claim 1, wherein the configuration indicates at least one of a modulation and coding scheme (MCS) table for the first CSI, an MCS table for the second CSI, or a quantity of bits to be used for the indication of the delta CSI.

3. The apparatus of claim 1, wherein the one or more processors are further configured to determine the first CSI based at least in part on the configuration associated with reporting the delta CSI or a measurement of a reference signal transmitted by the base station.

4. The apparatus of claim 1, wherein the one or more processors are further configured to determine the second CSI based at least in part on at least one of the configuration associated with reporting the delta CSI, a CSI report received from the second wireless communication device, or a measurement of a reference signal transmitted by the second wireless communication device.

5. The apparatus of claim 1, wherein the configuration indicates that the CSI report is to include the indication of the first CSI and the CSI report includes the indication of the first CSI.

6. The apparatus of claim 1, wherein the configuration indicates that the CSI report is to include the indication of the second CSI and the CSI report includes the indication of the second CSI.

7. The apparatus of claim 1, wherein the first connection is a connection over a Uu link.

8. The apparatus of claim 1, wherein the first CSI is a first channel quality indicator (CQI) value and the second CSI is a second CQI value.

9. The apparatus of claim 1, wherein a modulation and coding scheme (MCS) table associated with the first connection is the same as an MCS table associated with the sidelink connection.

10. The apparatus of claim 9, wherein the indication of the delta CSI is carried in a single bit, wherein a value carried in the single bit indicates whether the first CSI is greater than the second CSI.

11. The apparatus of claim 9, wherein the indication of the delta CSI is carried in a plurality of bits, wherein values carried in the plurality of bits identify the difference between the first CSI and the second CSI, the values being determined based at least in part on a table configured via radio resource control (RRC) signaling.

12. The apparatus of claim 9, wherein the delta CSI is computed based at least in part on a rank associated with the first connection and a rank associated with the sidelink connection.

13. The apparatus of claim 1, wherein a modulation and coding scheme (MCS) table associated with the first connection is different from an MCS table associated with the sidelink connection.

14. The apparatus of claim 13, wherein the first CSI is a first spectral efficiency metric computed based at least in part on a channel quality indicator (CQI) value associated with the first connection and the second CSI is a second spectral efficiency metric computed based at least in part on a CQI value associated with the sidelink connection.

15. The apparatus of claim 13, wherein the first CSI is a first signal-to-interference-plus-noise ratio (SINR) associated with the first connection and the second CSI is a second SINR associated with the sidelink connection.

16. The apparatus of claim 1, wherein the indication of the delta CSI carries a value indicating that either the first CSI or the second CSI is unknown or outdated.

17. The apparatus of claim 1, wherein the delta CSI is first delta CSI, and the one or more processors are further configured to compute second delta CSI based at least in part on the configuration, wherein the second delta CSI indicates a difference between the first CSI and third CSI associated with a third connection, the third connection being between the first wireless communication device and a third wireless communication device, and wherein the CSI report includes an indication of the second delta CSI.

18. The apparatus of claim 17, wherein the CSI report includes information associating the first delta CSI and the second wireless communication device and information associating the second delta CSI and the third wireless communication device.

19. The apparatus of claim 17, wherein the CSI report is transmitted in a physical uplink control channel (PUCCH) communication or a medium access control (MAC) control element.

20. An apparatus for wireless communication at a base station, comprising:
  memory; and
  one or more processors, coupled to the memory, configured to:
    transmit, to a first wireless communication device, a configuration associated with reporting delta channel state information (CSI) for sidelink; and
    receive a CSI report from the first wireless communication device, wherein the CSI report includes:
      an indication of a delta CSI computed in association with a sidelink connection between the first wireless communication device and a second wireless communication device, wherein the delta CSI indicates a difference between first CSI, associated with a first connection between the first wireless communication device and the base station, and second CSI associated with the sidelink connection, and
      at least one of:
        an indication of the first CSI, wherein the delta CSI provides information associated with the second CSI associated with the sidelink connection, or
        an indication of the second CSI associated with the sidelink connection, wherein the delta CSI provides information associated with the first CSI.

21. The apparatus of claim 20, wherein the one or more processors are further configured to schedule a communication on at least one of the first connection or the sidelink connection based at least in part on the delta CSI.

22. The apparatus of claim 20, wherein the configuration indicates at least one of a modulation and coding scheme (MCS) table for the first CSI, an MCS table for the second CSI, or a quantity of bits to be used for the indication of the delta CSI.

23. The apparatus of claim 20, wherein the configuration indicates that the CSI report is to include the indication of the first CSI and the CSI report includes the indication of the first CSI.

24. The apparatus of claim 20, wherein the configuration indicates that the CSI report is to include the indication of the second CSI and the CSI report includes the indication of the second CSI.

25. The apparatus of claim 20, wherein the first connection is a connection over a Uu link.

26. The apparatus of claim 20, wherein a modulation and coding scheme (MCS) table associated with the first connection matches an MCS table associated with the sidelink connection.

27. The apparatus of claim 20, wherein a modulation and coding scheme (MCS) table associated with the first connection is different from an MCS table associated with the sidelink connection.

28. The apparatus of claim 20, wherein the delta CSI is first delta CSI and the CSI report includes an indication of a second delta CSI indicating a difference between the first CSI and third CSI associated with a third connection, the third connection being between the first wireless communication device and a third wireless communication device.

29. A method of wireless communication performed by a first wireless communication device, comprising:
  receiving a configuration associated with reporting delta channel state information (CSI) for sidelink;
  computing, using the configuration, the delta CSI in association with a sidelink connection between the first wireless communication device and a second wireless communication device,
    wherein the delta CSI indicates a difference between first CSI, associated with a first connection between the first wireless communication device and a base station, and second CSI associated with the sidelink connection; and
  transmitting a CSI report based at least in part on the configuration, the CSI report including an indication of the delta CSI and at least one of:
    an indication of the first CSI, wherein the delta CSI provides information associated with the second CSI associated with the sidelink connection, or
    an indication of the second CSI associated with the sidelink connection, wherein the delta CSI provides information associated with the first CSI.

30. A method of wireless communication performed by a base station, comprising:
  transmitting, to a first wireless communication device, a configuration associated with reporting delta channel state information (CSI) for sidelink; and
  receiving a CSI report from the first wireless communication device using the configuration, wherein the CSI report includes:
    an indication of a delta CSI computed in association with a sidelink connection between the first wireless communication device and a second wireless communication device, wherein the delta CSI indicates a difference between first CSI, associated with a Uu connection between the first wireless communication device and the base station, and second CSI associated with the sidelink connection, and
    at least one of:
      an indication of the first CSI, wherein the delta CSI provides information associated with the second CSI associated with the sidelink connection, or
      an indication of the second CSI associated with the sidelink connection, wherein the delta CSI provides information associated with the first CSI.

\* \* \* \* \*